March 20, 1934.  W. A. WOOD  1,951,956
AIR FILTER
Filed March 16, 1932   2 Sheets-Sheet 2
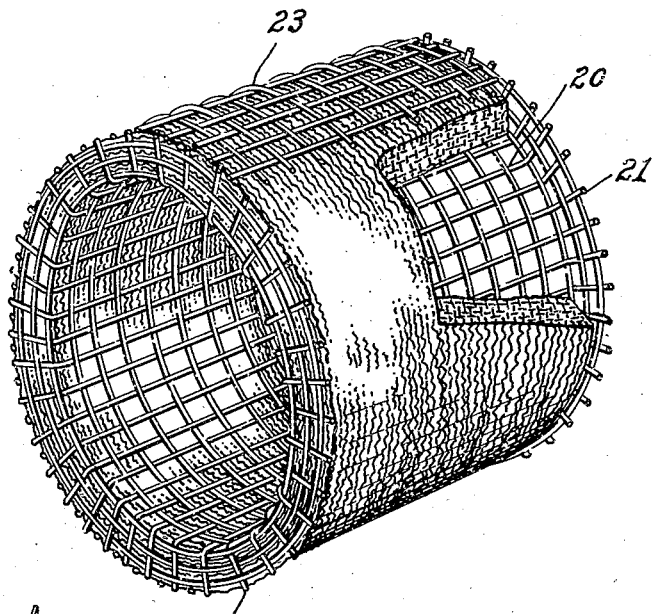
Fig. 3.
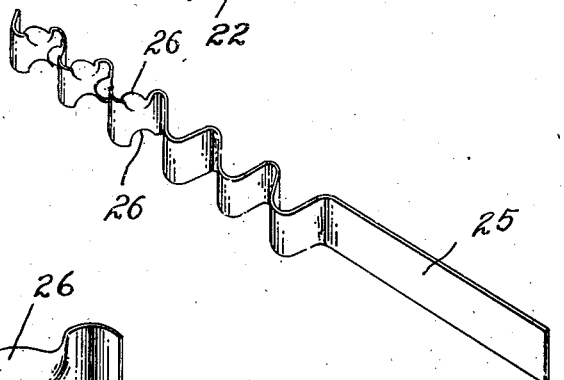
Fig. 5.
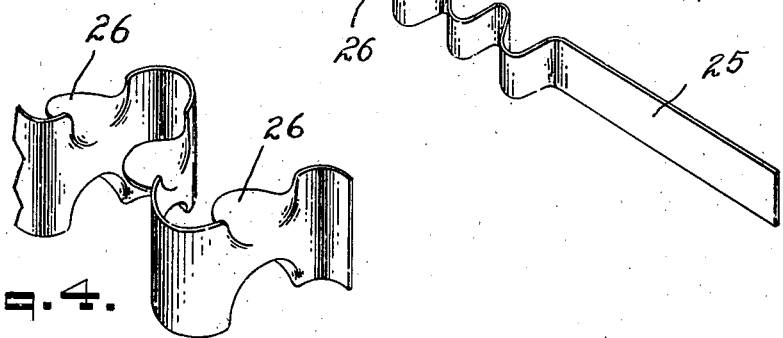
Fig. 4.
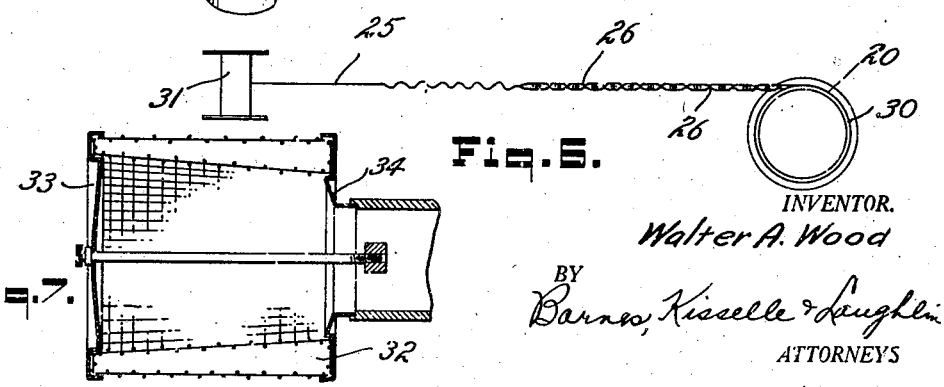
Fig. 6.
Fig. 7.
INVENTOR.
Walter A. Wood
BY
Barnes, Kisselle & Laughlin
ATTORNEYS Patented Mar. 20, 1934

1,951,956

UNITED STATES PATENT OFFICE 1,951,956

AIR FILTER

Walter A. Wood, Detroit, Mich., assignor to Handy Governor Corporation, Detroit, Mich., a corporation of Michigan Application March 16, 1932, Serial No. 599,209

11 Claims. (Cl. 183—73)

This invention relates to an air filter such as may be employed with internal combustion engines used in automotive vehicles or for stationary work, and arranged so that the air which is utilized in the combustible mixture may pass therethrough and be cleaned. The desirability of and advantages of a device for cleaning the air used by internal combustion engines are known to those versed in the art, so that it is not necessary herein to relate the desirability and advantages of air cleaning or filtering devices in a general way.

The present invention is directed towards the provision of a device which may be more properly termed an air filter rather than an air cleaner and accordingly it is so termed herein, but this terming of the device as a filter is not to be construed as a limiting description.

Among the objects of the invention is the provision of an improved air filter which provides a multiplicity of interstices through which the air passes as well as a method for making the filter. The filter of the present invention is one which may be employed with a substance such as oil or the like which is on the surface of the material forming the interstices so that as the air passes therethrough, particles of dust, dirt, or the like which may be in the air may be caught by the substance and retained, thus cleaning the air of such particles.

One of the primary objects of the invention is the provision of an air filter wherein there is great uniformity in the interstices, particularly a uniformity as to size. In some air filters as have been heretofore proposed there is a likelihood of relatively large passageways forming in the substance designed to afford small passageways for air to the end that large volumes of air pass through the large passageways and the cleaning action occurs only on the outer portions of the volume of air so that dust particles or the like are not removed from the center portions thereof. Furthermore, where a large air passageway is present, less resistance to air movement is present through the large passageway results in the greater proportion of the air passing through the large passageway with a smaller portion passing through the small interstices or passageways. The large passageways may be formed during the manufacture of the devices or may form during use thereof.

In accordance with the present invention the air filter is of such a construction and is so made that it is definitely known at the time of manufacture that there are no large passageways in the substance forming the body with the interstices, and the structure is also such that there is practically no likelihood of large passageways being formed during the life and use of the filter.

More specifically the invention contemplates an air cleaner wherein the body forming the multiplicity of interstices is constituted by windings of stock—particularly, metal stock. One way of carrying out the invention is to form the filtering body by winding a long length of metal of wire or ribbon form and the length of material is preferably given an irregular shape so that adjacent windings cooperate to form small openings or interstices between themselves. As shown herein the metal stock is of ribbon form; that is to say, a relatively thin and relatively wide strip.

The invention and other objects will be better understood as the detail description progresses.

Fig. 1 is an end view with some parts cut away illustrating a filter constructed in accordance with the invention.

Fig. 2 is a side view with parts cut away and with parts in section.

Fig. 3 is a perspective view with parts cut away illustrating the filtering body.

Fig. 4 is a detailed perspective showing one manner in which the strip may be irregularly formed.

Fig. 5 is a perspective view illustrating successive shapes of the strip as it is preferably formed for winding purposes.

Fig. 6 is a diagrammatic view in illustration of the method by which the filter is made.

Fig. 7 is a view illustrating a modified form.

The filter may be constructed as illustrated in Figs. 1 and 2 wherein it will be seen that there is an end plate or disk 1 shaped with an offset 2 to provide a channel formation, the back wall of which is at 3 with the other side of the channel as shown at 4, being constituted by the edge metal of the disk. A similar disk on the other end of the filter, is shown at 5; whereas the disk 1 may be substantially closed, the disk 5 may have an outlet aperture formed as at 6. The disk 5 is offset as at 7 so that a channel formation is provided between this offset and the edge of the metal 9 connected by a back for the channel as at 10. These two disks may form opposite ends of a cylindrically shaped filter, and a hollow body of filtering material may be held in position in the opposing circular channels of the two end disks. In the completed structure the end disks may be held from separation by strips of wire or the like 11 passing from one to the other with its ends passing through apertures in the disks defined by adjacent portions of the deformed corrugated strip.

2. An air filter, comprising a cylindrical hollow body, a screen defining the inner wall thereof, a screen defining the outer wall thereof, the said screens providing a space between them, and a ribbon of strip material having deformed corrugations therein and fashioned into a plurality of superimposed helixes and located in the space between the screens.

3. An air filter, comprising a cylindrical hollow body, a screen defining the inner wall thereof, a screen defining the outer wall thereof, the said screens providing a space between them, a ribbon of strip material having deformed corrugations therein and fashioned into a plurality of superimposed helixes and located in the space between the screens, a closure plate at one end of the said body, and a closure plate at the other end of said body and having an air passageway therethrough.

4. An air filter, comprising a cylindrical hollow body, a screen defining the inner wall thereof, a screen defining the outer wall thereof, the said screens providing a space between them, a ribbon of strip material having deformed corrugations therein fashioned into a plurality of superimposed helixes and located in the space between the screens, a closure plate at one end of the said body, a closure plate at the other end of said body and having an air passageway therethrough, said closure plates having circular channels formed therein into which the ends of the hollow cylindrical body fits, and means interconnecting the closure plates.

5. The method of making an air filter, which comprises corrugating substantially cross-wise a strip of material substantially in ribbon form, deforming said corrugations, and then winding the strip into a plurality of superimposed helixes.

6. An air filtering body, comprising a narrow metallic ribbon corrugated crosswise, the edges of the ribbon being deformed to prevent the corrugations from interfitting with like corrugations, said body formed of a plurality of superimposed helical windings of the ribbon, said corrugations and deformed edges serving to space adjacent convolutions and superimposed windings to provide a multiplicity of interstices through the body between adjacent convolutions of the helical windings and between superimposed windings.

7. An air filtering body comprising a narrow metallic ribbon corrugated crosswise, edge portions of the ribbon being fashioned over so as to project into furrows formed by the corrugations to prevent the corrugations from closely interfitting with like corrugations, said body formed of a plurality of superimposed helical windings of the ribbon, and having a multiplicity of interstices defined by adjacent convolutions of the helical windings and by superimposed windings.

8. An air filtering device comprising a hollow body, said body comprising a plurality of superimposed helical windings of metallic ribbon, said ribbon having a width relatively narrow as compared to the cross-sectional thickness of a wall of a hollow body and as compared to the length thereof, said ribbon being corrugated crosswise and having edge portions fashioned over so as to project into furrows formed by the corrugations adapted to prevent close interfitting of adjacent convolutions of the helical windings and of superimposed helical windings to provide a multiplicity of interstices in the wall of the hollow body.

9. An element for an air filter comprising, a ribbon corrugated substantially crosswise and having edge portions fashioned over substantially into the furrows of the corrugations.

10. An air filtering device, comprising a ribbon strip of material substantially in corrugate form with the corrugations running crosswise of the strip, the edges of the strip having spaced portions each of which are disposed at an angle to the general direction of extent of the body of the strip adjacent each portion to prevent adjacent corrugations from interfitting, said strip being formed into a body composed of a plurality of superimposed helixes, said body having a multiplicity of interstices therein defined by adjacent portions of the corrugate strip.

11. The method of making an air filtering body which comprises corrugating a ribbon strip crosswise, fashioning the edges of the strip at spaced places to form portions each of which is disposed at an angle as regards the body of the strip adjacent each portion, and then winding the strip into a plurality of superimposed helixes.

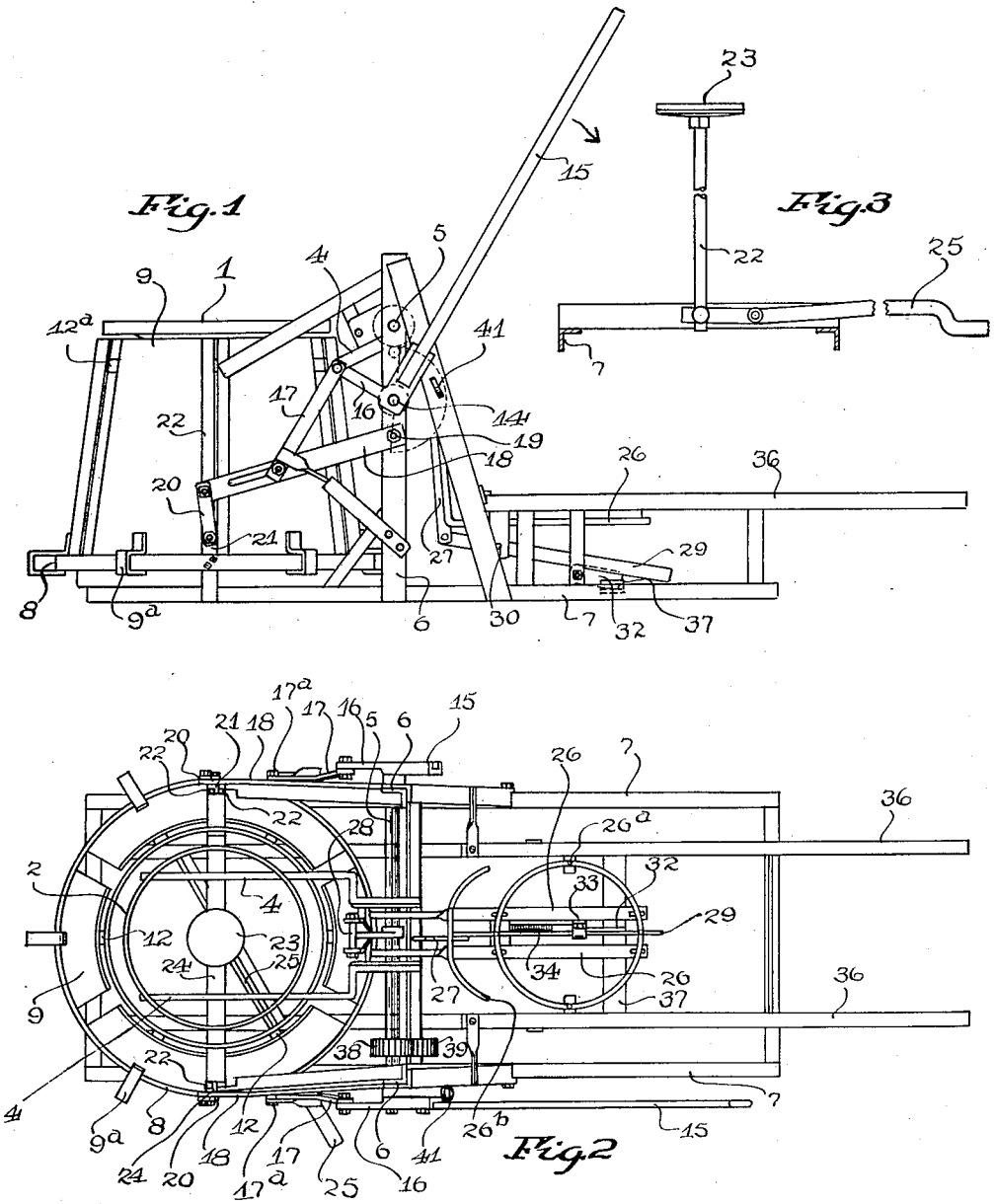

WALTER A. WOOD.